(12) United States Patent
Anzani et al.

(10) Patent No.: US 6,357,985 B1
(45) Date of Patent: Mar. 19, 2002

(54) SYSTEM FOR THE AUTOMATIC LOADING AND/OR UNLOADING OF PRODUCTS

(76) Inventors: Lanfranco Anzani, via Villoresi, 48 - Parabiago (Milan); Onorio Anzani, Via Emanuele Filiberto, 7 - Parabiago (Milan), both of (IT)

( * ) Notice: Subject to any disclaimer, the term of this patent is extended or adjusted under 35 U.S.C. 154(b) by 0 days.

(21) Appl. No.: 09/456,691

(22) Filed: Dec. 9, 1999

(30) Foreign Application Priority Data

Dec. 18, 1998 (IT) ......................................... MI98A2736

(51) Int. Cl.⁷ ................................................ B65G 1/10
(52) U.S. Cl. ............. 414/331.05; 414/276; 414/331.04; 414/331.16; 414/271; 414/278; 211/152; 193/35 R; 198/435; 198/528; 198/530; 198/346.2
(58) Field of Search ................................ 414/280, 276, 414/269, 270, 331.01, 278, 331.03, 331.04, 331.05, 331.08, 331.14, 331.16, 271, 331 FOR; 211/1.51, 1.52, 1.55; 198/435, 523, 528, 530, 463.3, 346.2; 193/35 R, 35 A, 37

(56) References Cited

U.S. PATENT DOCUMENTS

| | | | |
|---|---|---|---|
| 2,790,567 A | 4/1957 | Rockhill | |
| 3,133,622 A | 5/1964 | Immesberger | |
| 4,239,436 A | * 12/1980 | Wildenaur | .................. 414/276 |
| 4,509,893 A | 4/1985 | Kurokawa et al. | |
| 4,527,937 A | * 7/1985 | Tomassello, Jr. | ........ 414/276 X |
| 4,752,175 A | * 6/1988 | Lichti | .......................... 414/276 |
| 4,909,697 A | 3/1990 | Bernard, II et al. | |
| 4,968,207 A | * 11/1990 | Lichti | .................... 414/331.03 |
| 5,024,572 A | * 6/1991 | Tanaka et al. | .............. 414/276 |
| 5,234,306 A | * 8/1993 | Yamashita | ............. 414/331.04 |
| 5,238,349 A | 8/1993 | Grace, Sr. | |
| 5,593,269 A | * 1/1997 | Bernard, II | ............ 414/331.04 |

FOREIGN PATENT DOCUMENTS

| | | | |
|---|---|---|---|
| DE | 3408941 | 9/1985 | |
| EP | 0022441 | 1/1981 | |
| EP | 0096505 | * 12/1983 | ................. 414/276 |
| GB | 1546788 | * 5/1979 | ................. 414/276 |
| JP | 56-161203 | * 12/1981 | ................. 414/276 |
| JP | 59-212304 | * 12/1984 | ................. 414/331 |
| JP | 60-153303 | * 8/1985 | ................. 414/331 |
| JP | 63-180605 | * 7/1988 | ................. 414/276 |
| JP | 3-267205 | * 11/1991 | ................. 414/276 |
| WO | 8702016 | 4/1987 | |

* cited by examiner

*Primary Examiner*—Frank E. Werner
(74) *Attorney, Agent, or Firm*—Bucknam and Archer (57) ABSTRACT

A system for the automatic loading and/or unloading of products comprises a store (13, 19) with shelves inclined and provided with a mobile transversal blocking means (9, 12), and at least one traveling lift (3) provided with mobile bearing tops (4), also inclined and provided with at least one mobile transversal blocking means (9, 12). Said inclined shelves and bearing tops (4) are provided with transversal, parallel, idle and inclined rollers (5) whereon a product or a product container (1) can slide by gravity when the blocking means is lowered.

11 Claims, 6 Drawing Sheets

SYSTEM FOR THE AUTOMATIC LOADING AND/OR UNLOADING OF PRODUCTS

BACKGROUND OF THE INVENTION

1. Field of the Invention

The present invention relates to a system for the automatic loading and/or unloading of products.

More particularly, the present invention relates to a system for the automatic loading and/or unloading of products comprising a store having raised and/or superposed shelves and at least one traveling lift provided with at least one mobile bearing top.

2. Description of the Prior Art

As is known, the modern automatic stores provided with vertical development superposed parallel tops as well as the stores located in areas raised and/or superposed to other operating zones, or in any case areas where the space available must be rationalized, are provided with at least a traveling lift without any operator, for the automatic loading and/or unloading of products.

The traveling lifts are generally equipped with a product bearing mobile horizontal top, means for positioning the top with respect to the emplacements of the stores, for the loading and/or unloading of the products, and means for the removal and/or the introduction of the products from the emplacements to the top.

The positioning and the loading and unloading operations of the traveling lifts are automatically or semi-automatically adjusted by computerized means or the like, through programs purposing to searching the products through codes, coordinates, and so on.

These technologies for storing and handling the products, though having proved effective for many applications and having revolutionized the old systems, causing the whole to be more rational, rapid, automated, codified and almost error-free, have however some drawbacks that limit their possible further development.

These drawbacks and limitations are mainly due to their constructive and functional complexity and, in particular, to the high cost and the operating rationality of the automatic traveling lifts.

A first drawback lies in that the traveling lifts necessarily comprise gripping means such as, for instance, extensible parts such as pliers, forks, platforms, arms, hooks and the like, which must be capable of seizing in the best way the products, the packs, the packages, the containers or the boxes containing the stored products, to carry out the loading and/or unloading operations from the emplacements of the stores. Obviously, said parts and the related controls are particularly complex and expensive.

Another drawback lies in that, because of the very presence of said gripping means, also the emplacements of the store must be prearranged an sized taking into account the space necessary for their passage and their action. As a result, the emplacements have a size greater than the necessary size, to the detriment of an optimum exploitation of the space available.

Other storing means are also known which have inclined roller tops for storing two or more boxes and for positioning the same, on the arrival, in the first free emplacement. Such systems, though being valid for particular applications, have however the drawback that, in order to send a box located at the rear of the expected working place, it is necessary to cause all the boxes located before it to re-circulate, with a useless, long, expensive and irrational shifting.

SUMMARY OF THE INVENTION

The object of this invention is to eliminate said drawback of the known stores for the automatic loading and/or unloading.

More particularly, the object of the invention is to provide a store for the automatic loading and/unloading that is simple from the constructive and functional points of view and such as not to require additional spaces for the passage and the action of the sizing means.

In its more general aspect, the present invention allows to achieve these and other aims, that will explained by the following description, by carrying out by gravity the automatic handling of the products, during the loading and/or unloading and the transportation, for instance by using inclined tops.

Therefore, the subject matter of this invention is a system for the automatic loading and/or unloading of products comprising a store provided with at least one shelf, and at least one traveling lift provided with at least one mobile bearing top, wherein both the shelf or shelves of the store and the top or tops of the traveling lift are inclined and provided with at least one mobile transversal blocking means.

The shelves of the store and the mobile tops of the traveling lift are inclined and constituted by a plurality of idle rollers, transversal and parallel to each other.

The mobile transversal blocking means protrudes from said tops and shelves, and is preferably located in correspondence of the lowest side thereof.

In the loading and unloading emplacement, the mobile bearing top of the traveling lift is connected to the corresponding fixed shelf of the store by means of intermediate fixed inclined tops, provided with transversal, parallel and idle rollers.

The store may have a vertical development and be provided with only one vertical traveling lift for the loading and the unloading of the products, or with two vertical traveling lifts located at the opposite sides in correspondence of the loading and unloading positions.

When short loading and unloading times are required, the travelling lifts may comprise couples of mobile bearing tops subjected to one only motorization and with opposite movements, namely an upwards and a downwards movement. In this way, when a loaded top moves upwards to position in correspondence of a fixed shelving emplacement, the other unloaded top moves downwards to be prepared for a subsequent loading. This arrangement allows to halve the operating times.

As an alternative, the store may also be of the rotary carousel type with several superposed tops and the traveling lifts may be transversal and fixed, and one of them at least has inclined tops.

The inclined bearing tops of the vertical or vertical and transversal traveling lifts are coupled to fixed loading and unloading shelves, associated with conveyors or the like, and to the tops of store shelves, which may also be inclined and constituted by idle, transversal and parallel rollers. The fixed shelves of the shelving follow the same inclination as the bearing top of the traveling lift or the loading and unloading paths, in a sequence organized according to the same inclination orientation.

Gravity causes each arriving product or product box to be stored to slide on said rollers and descend along the sequential inclined top or tops, stopping only against the transversal raised blocking means it meets near the lowest unloading edge of each intermediate top or each bearing top.

The transversal blocking means remains in opening position, raised with respect to the top, along the travel of a traveling lift or the like, from its loading emplacement to its arrival or unloading emplacement, or during its stay on the shelves. The blocking means are lowered, and the product laid on them re-starts sliding by gravity on the rollers, coming out of the traveling lift and unloading in the arrival emplacement, which may be either a shelf of an intermediate store or a transferring conveyer or the like.

The bearing tops and the shelves of the products to be handled, as being inclined and consisting of a plurality of idle transversal rollers, ensure the sliding on the same by gravity only, of any mass of product packings; the movements of the products take place only by raising/lowering the transversal blocking means located downstream of the inclined tops, and activated by elementary controls only.

The advantages achieved with the automatic loading and/or unloading store of the present invention arise essentially from the fact that gravity handling is simple, effective, reliable, rapid, very economical and applicable to any traveling lifts or handling means, independently on the type of products and/or packages of products to be handled and on the type of store for which the traveling lifts or said means are intended.

BRIEF DESCRIPTION OF DRAWINGS

The constructive and functional characteristics of the system for the loading and/or unloading of the products of the present invention will be better understood thanks to the detailed description that follows, wherein reference is made to the attached drawings which represent embodiments solely given by way of non limiting examples, and wherein.

DESCRIPTION OF PREFERRED EMBODIMENTS

Figure 1:
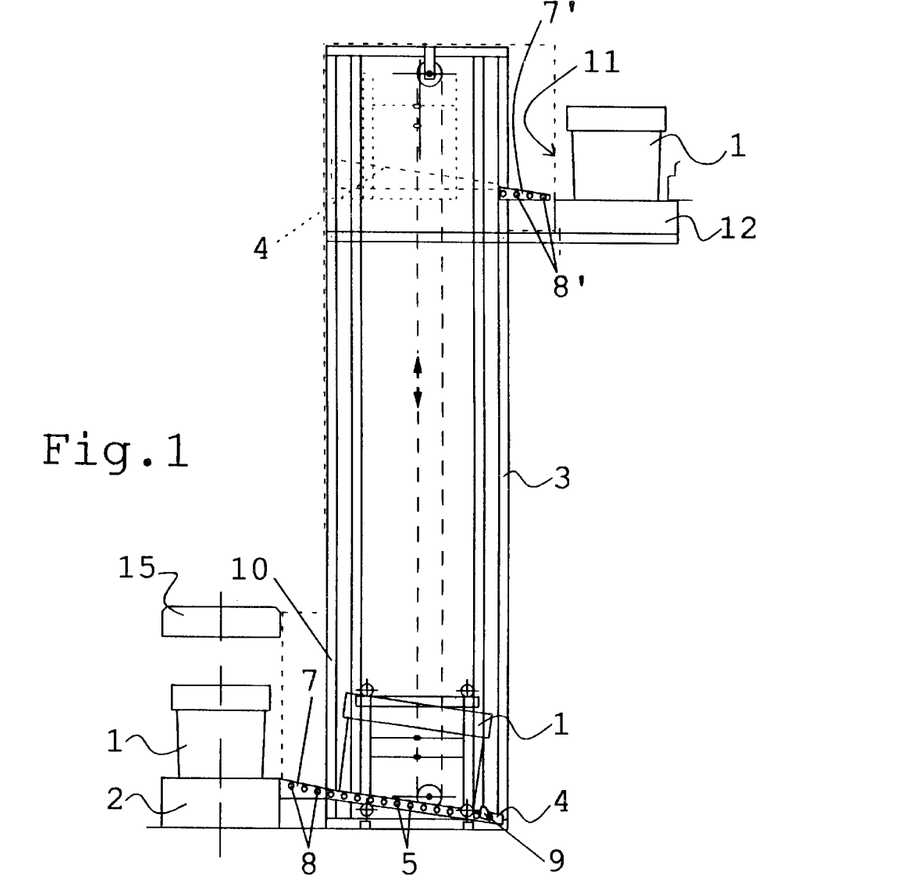
FIG. 1 shows the schematic side view of a vertical automatic traveling lift, with mobile, inclined, transversal idle rollers, associated to loading and unloading means with flat conveying belts.
Figure 2:
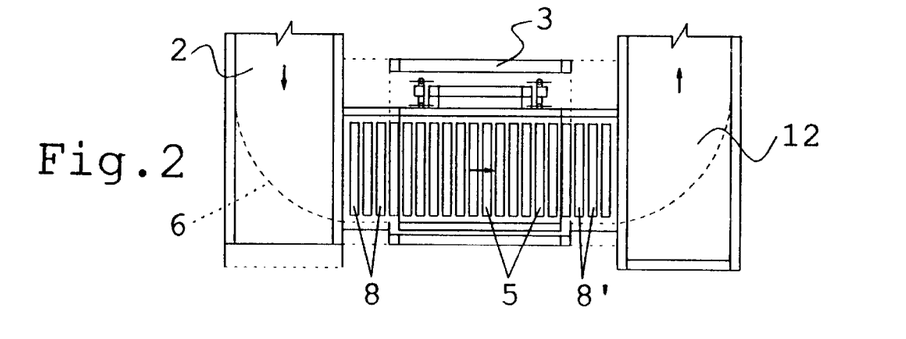
FIG. 2 shows the schematic plan view of the traveling lift of FIG. 1, having one only mobile bearing top.
Figure 3:
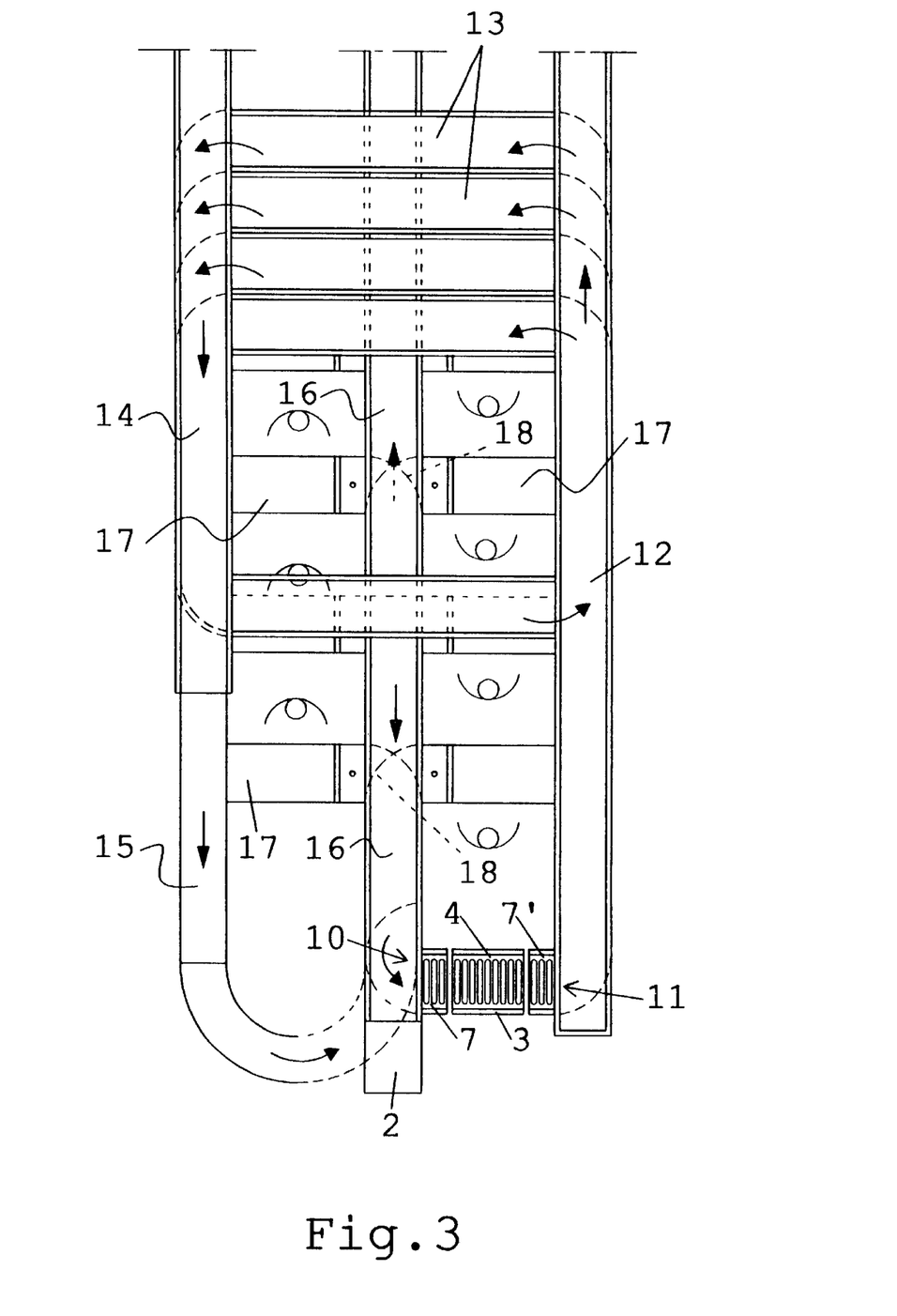
FIG. 3 shows the schematic plan view of an example of embodiment of the traveling lift of FIGS. 1 and 2.

With reference to FIGS. 1, 2 and 3, a product, a container or a box (1) containing the products to be handled and/or stored is conveyed by a conveying belt (2) towards at least a vertical, automatic or vertical and transversal automatic traveling lift (3), without any operator, comprising a mobile bearing top (4), inclined and comprising a plurality of transversal, parallel and idle rollers (5).

Box (1), arriving from the conveyer belt (7) is pushed by means of a shunting (6) towards a first inclined fixed top (7) with transversal, parallel and idle rollers (8) in correspondence of which the mobile bearing top (4) of the traveling lift (3) is positioned. Gravity causes box (1) to slide on rollers (8) of the fixed inclined top (7), to continue its travel on rollers (5) of the mobile bearing top (4) of the traveling lift (3) and to stop against a blocking means, constituted by a raised and protruding bar (9), located at the downstream end of the mobile bearing top (4).

Box (1) is kept in such position on the inclined top (4) during the travel made by the traveling lift (3) from the loading emplacement (10) to the programmed unloading emplacement (11). When it reaches such emplacement, the transversal blocking bar (9) is automatically lowered, and box (1) resting thereon, being no longer detained, starts again to slide by gravity on rollers (5), coming out from the bearing top (4) of the traveling lift (3) and unloading in emplacement (11) through a second fixed inclined top (7'), provided with transversal, parallel and idle rollers (8') and positioned exactly in correspondence of the bearing top (4) in the unloading emplacement (11).

In the reference example of the aforementioned figures, the unloading emplacement (11) is made up by a conveying belt (12) which collects the arriving boxes (1), transferring them to storing zones or shelves (13) located, for instance, on the top of a plant for the sequential mass production of footwear.

In the exemplified specific embodiment, the boxes (1), present in the raised shelvings (13), whose shelves also comprise a plurality of rollers, are automatically pushed back into cycle, freeing them from a transversal blocking means. They are conveyed to a conveyor (14) which accompanies them towards a chute (15), through which they are conveyed to a second conveying belt (16) which leads them to the work stations (17).

Each work station (17) is provided with a collection conveyor (18) of a known type, whose programmed working sequences depends on the work cycle.

At the end, the boxes (1) with the elaborated products are loaded on the lower conveying belt (2) and sent to the storing zones (13) according to the procedure described above.

Figure 4:
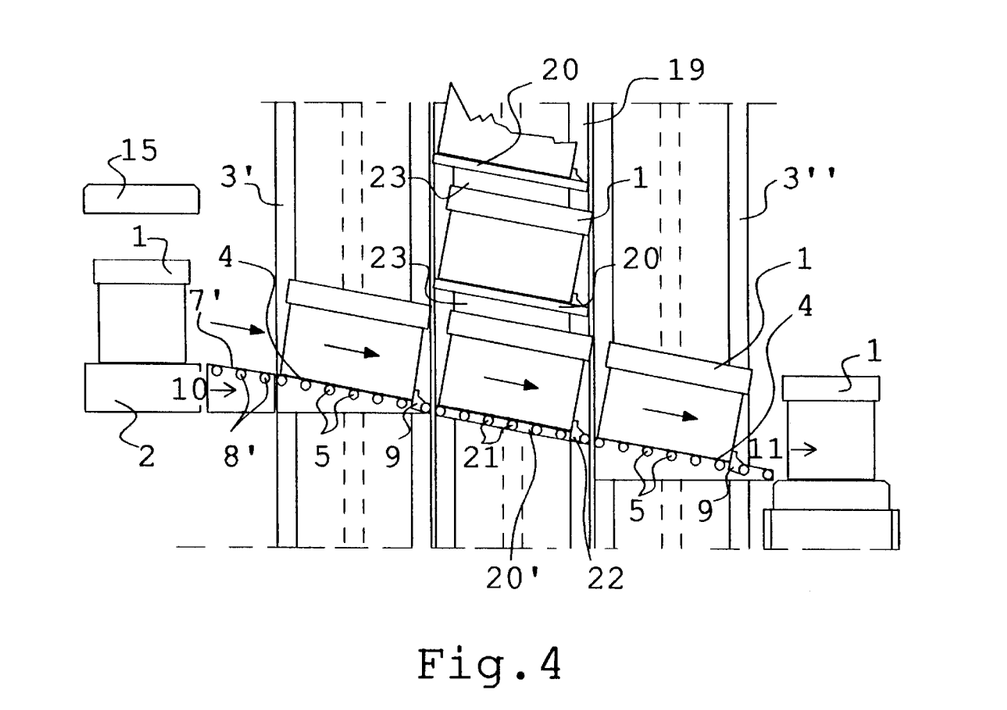
FIG. 4 shows the schematic view of a side section of a couple of automatic vertical traveling lifts with inclined bearing tops, associated to an intermediate store made up by shelves aligned on parallel superposed rows provided with inclined bearing tops borne by transversal, parallel and idle rollers.

FIG. 4 shows a second embodiment of the system for the automatic gravity loading and/or unloading of the present invention. It comprises traveling lifts (3', 3"), located at the opposite sides of a store having a vertical development (19).

Also the fixed shelves of the store are inclined and comprise a plurality of transversal and parallel idle rollers (21), provided with a blocking bar (22) located at the lowest end of each shelf (20).

The fixed shelves (20) are substantially equal to the bearing shelves (4) of the traveling lifts (3', 3") and operate in the same way.

In this embodiment, the loading (10) and the unloading (11) emplacements are substantially aligned with the opposite ends of the lower inclined shelf (20') of the store (19), so at to be in condition of operating throughout the extension of said store.

Between the loading emplacement (10) and the vertical store (19), and between said vertical store (19) and the unloading emplacement (11) there are located two traveling lifts (3' and 3"), entirely identical to the one (3) shown in FIG. 1 and described above.

The respective inclined loading tops (4) of said traveling lifts (3', 3") are sequentially aligned with both the loading (10) and unloading (11) emplacements and the housings (23) of the store (19).

The arriving boxes (1) are pushed towards the first fixed inclined top (7'), comprising transversal, parallel and idle rollers (8'), before which the inclined bearing top (4) of the traveling lift (3') positions. By gravity, the boxes (1) slide on rollers (8') of the fixed inclined top (7'), continue their travel on rollers (5) of the bearing top (4) of the traveling lift (3'), until they stop against the raised and protruding blocking bar (9), located at the downstream of the bearing top (4). The boxes (1) are kept in such position on the inclined bearing top (4) during the travel which the traveling lift makes from the loading emplacement (10) to the pre-fixed housing (23). Afterwards, the transversal blocking bar (9) is automatically lowered and box (1) leaning on it, being no longer detained, starts again its sliding by gravity on the idle rollers (21), comes out from the bearing top (4) of the traveling lift (3') and unloads in said housing (23) sliding on the idle rollers (21) until it stops against the transversal blocking bar (22).

From the housings (23), the containers or boxes (1) are unloaded by means of the automatic lowering of the respective transversal blocking bars (22). The containers or boxes (1), being no longer detained, slide by gravity on the idle rollers (21), come out from housings (23) and, sliding on the idle rollers (5) of the traveling lift (3"), position on a previously aligned bearing top (4) of the same. The travel of each box or container (1) from the bearing top (4) of the traveling lift (3") to the unloading emplacement (11) takes place in the same way.

Figure 5:
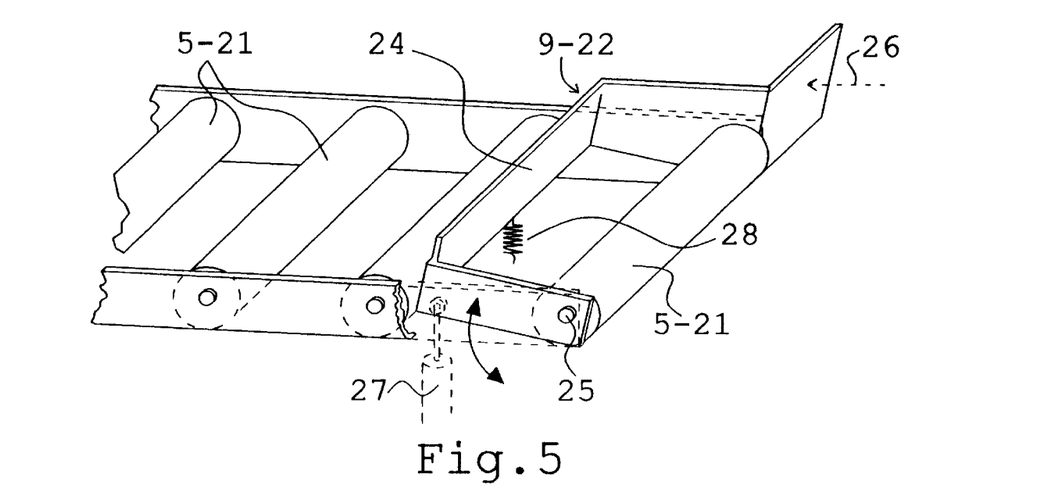
FIG. 5 shows a schematic perspective view of a transversal blocking means for idle roller inclined tops.

The blocking means (9, 22) may be activated by any means, such as for instance, means of the mechanical type, e.g. levers or the like, of the pneumatic and/or electropneumatic type, e.g. pistons, possibly applied on the bearing tops (4) of the traveling lifts (3, 3', 3") and on the shelves (20, 20') of the store. So, for instance, as shown in FIG. 5, said blocking means (9, 22) may comprise a crosspiece (24) having its fulcrum at the ends (25) of one of the idle rollers (5, 22) and activated through either a transversal pushing means (26) or a cylinder-vertical piston system (27), possibly combined with an elastic return means (28).

The position controls of the various alignment steps with respect to the positions of arrival, loading/unloading and outlet are realized by means of mechanical systems, for instance means for counting the impulses and the like, or by means of electronic systems such as PLC, Encoder, photoelectric cells and the like.

Figure 10:
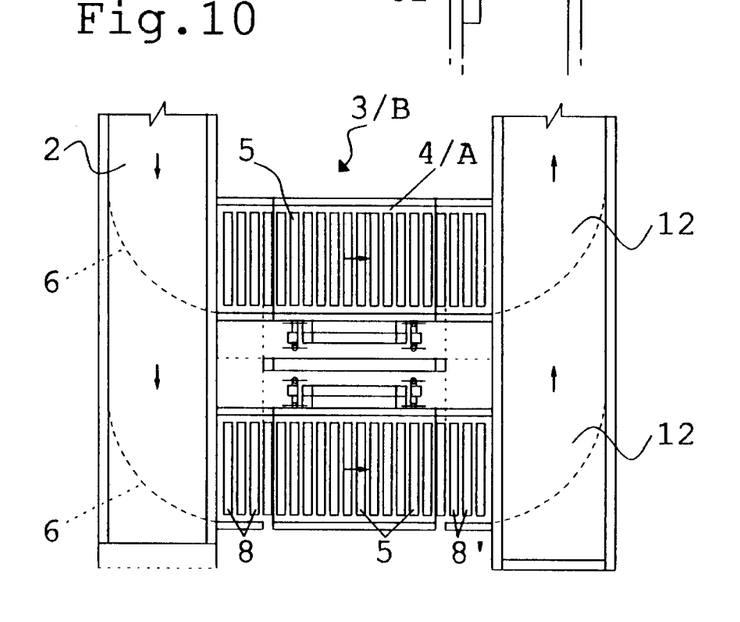
FIG. 10 represents a schematic plan view of a traveling lift of FIG. 1 having a double mobile bearing top, with an alternate vertical movement.

FIG. 10 represents a plan view of a traveling lift (3/B) which is provided with two mobile inclined bearing tops (4/A) whose configuration and working are identical to that above described, activated by one only motorization, with a vertical alternated and synchronized movement.

By using this traveling lift, it is possible to incease the number of containers or boxes (1) simultaneously moved, as, while one inclined bearing top (4/A) moves upwards for unloading, the other top moves downwards and it is ready for loading. In this way, the loading and unloading operations take place at the same time and alternatively on each of the two inclined bearing tops.

Figure 6:
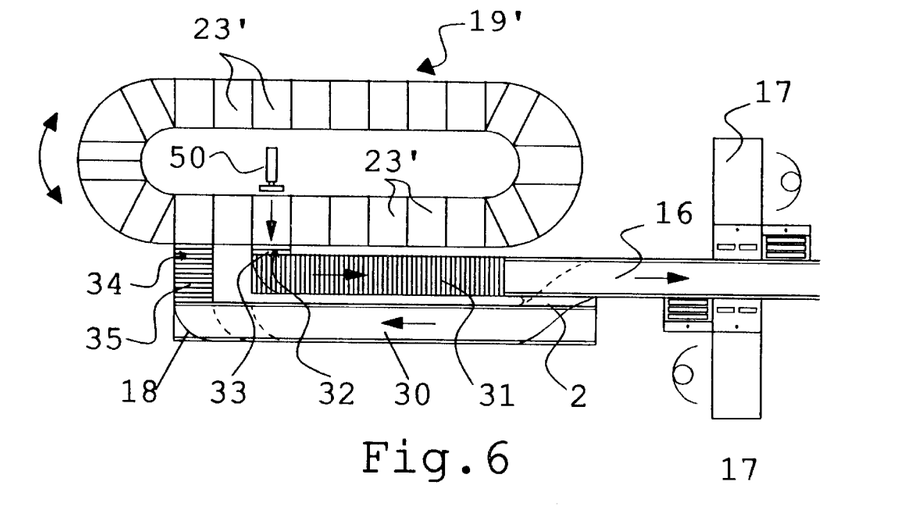
FIG. 6 shows a schematic plan view of a rotary carrousel store and of inclined and fixed loading and unloading traveling lifts.
Figure 7:
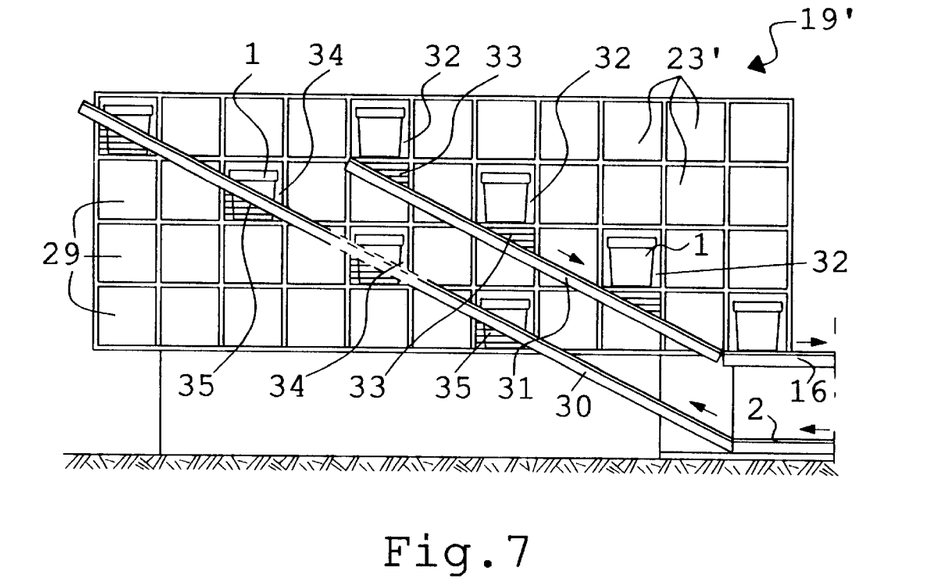
FIG. 7 shows the schematic side view of the rotary carrousel store of FIG. 6.

FIGS. 6 and 7 show another possible and advantageous embodiment for the automatic loading and/or unloading system of the present invention, wherein the functional concept is substantially like the one described hereabove, but the movements are inverted.

In this embodiment, store (19') is a rotary carrousel with the housings (23') aligned and located on several superposed shelves (29).

The superposed shelves (29) rotate simultaneously or independently to each other, either in the clockwise or the counter-clockwise direction, according to the shortest alignment travel of housing (23') with the loading (34) and/or unloading (32) stations. The loading of the products is carried out by at least a motor-driven lifting belt (30), and the unloading is carried out by gravity with at least one fixed traveling lift (31), provided with idle, transversal and parallel rollers. In this embodiment, the system is associated, for instance, to a working plant for the manufacture of footwear or like products provided with at least one work station (17).

The boxes (1) containing the products to be worked are removed from store (19'), when the rotation of the latter aligns the predetermined housing (23') in correspondence of the unloading station (32) of one of any of the various tops (29). The unloading stations (32) of the various housings are aligned along the inclined idle roller traveling lift (31) and are connected with the same by means of inclined tops (33). The unloaded boxes (1), by the action of a pushing means (50) or by a tilting shelf (20"), slide by gravity on the rollers of the traveling lifts (31) and are positioned on a conveyor (16) which conveys them towards the work stations (17).

The boxes (1) containing the already worked products are then positioned on conveyor (2) which conveys them on the loading lifting belt (30) for the return to the store (19'). Also in this case, on each store top (29) a loading station (34) is provided that has an inclined connection top (35) and a collection conveyor (18) of a known type. In correspondence of said station (34), housings (23') are aligned wherein the arriving boxes are put.

Figures 8, 9:
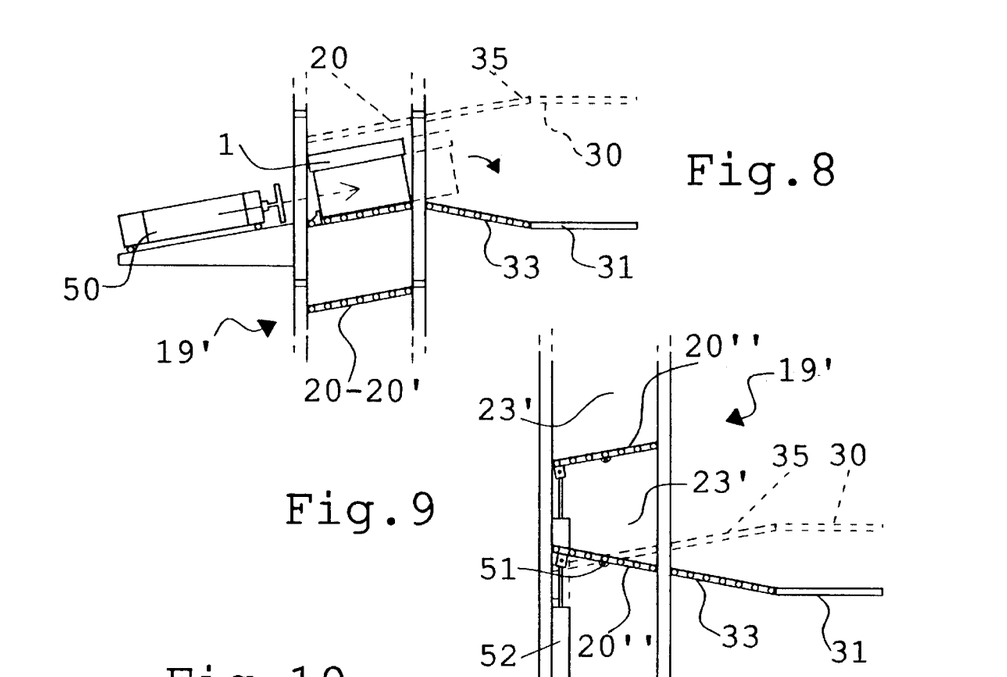
FIG. 8 represents the side view of a first example of the unloading traveling lift with pushing means for the rotary carrousel store of FIGS. 6 and 7.
FIG. 9 represents the side view of a second example of the unloading traveling lift with a tilting top for the rotary carrousel store of FIGS. 6 and 7.

The use of a pushing means (50), such as a piston or the like, aligned with each unloading station, or of tilting shelves (20"), having their fulcrum in their central part (51) and provided with moving means (52), such as pistons or the like, is required to allow the unloading of the boxes (1).

Pushing means (50) are employed in case of utilization of fixed shelves (20, 20') arranged in an inclined orientation to receive the boxes (1) to be stored that arrive from the lift belt (30) having a connection inclined top (35). During the unloading step, the pushing means (50) act on the boxes (1) to unload them on the inclined top (33) of the traveling lift (31), overcoming the height (level) difference of said shelves.

The tilting shelves (20"), which can rotate in a direction and in the opposite direction, allow their direct alligmnent with the inclined top (35) and with the lifting belt (30), during the loading operations, and with the inclined top (33) and the traveling lift (31), during the unloading operations.

The same handling principle may be adopted on each work station (17), for the loading and unloading of the arriving and leaving individual boxes.

Figure 11:
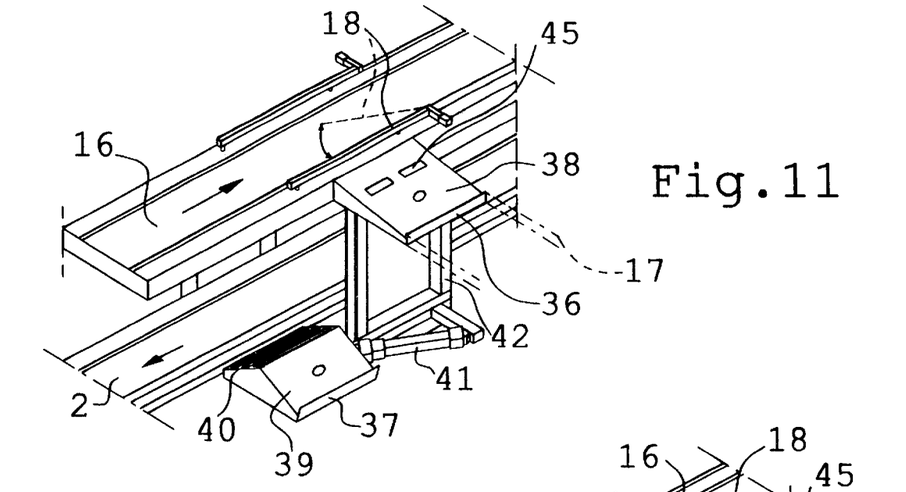
FIG. 11 shows the schematic view of a particular embodiment of the store of the present invention applied to work stations, with a fixed arrival emplacement and a mobile unloading emplacement.
Figures 12, 13:
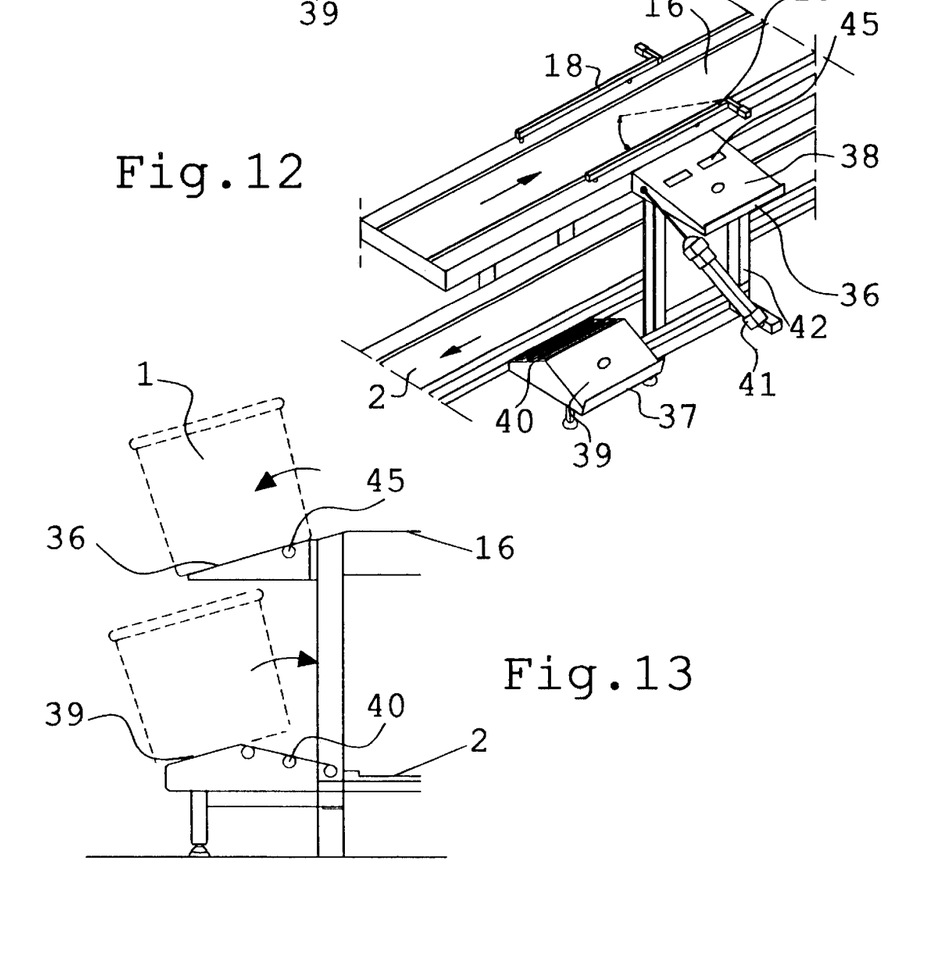
FIG. 12 shows a schematic view of another embodiment of the loading and/or unloading system of the present invention applied to work stations, with a mobile arrival emplacement and a fixed unloading emplacement.
FIG. 13 shows the schematic side view of the embodiments of FIGS. 11 and 12.

FIGS. 11, 12 and 13 show work stations (17), wherein boxes arriving from the second conveying belt (16) are deviated by conveyor (18) on the arrival emplacements (36) consisting of a fixed inclined shelf (38) provided with sliding rollers (45).

Two distinct solutions are possible: in the first one, shown in FIG. 11, the arrival emplacement (36) is of the fixed type, located alongside the work station (17) and associated to a leaving mobile emplacement (37). Said leaving mobile emplacement (37) comprises an inclined top (39) and an inclined top with rollers (40), opposed to each other. Said leaving emplacement (37) may alternatively position itself alongside the arrival emplacement (39) and in a alignement parallel to the return conveying belt (2).

The advance motion of the conveying belt (16) and the transversal positioning of conveyor (18) push and unload boxes (1), with the material to be worked, on the fixed inclined shelf (38) of the arrival emplacement (36).

The boxes are then translated on the inclined shelf (39) of the leaving emplacement (37) aligned with the arrival one (36). The emplacement (37) is lowered until it is aligned with the conveying belt (2), so that the products to be worked result to be, as far as their position and inclination are concerned, within the reach of the operators.

At the end of the working steps, box (1) containing the worked material, is pushed on the inclined top with rollers (40) of the leaving emplacement (37), and from here it starts going, by gravity, on the return conveying belt (2) directed towards the lifting belt (30) to return to the store (19').

In the second embodiment, shown in FIG. 12, the movements are inverted: the arrival emplacement (39) is mobile and alignable, alternatively, with the arriving conveying belt (16) and the leaving emplacement (37), which is fixed and aligned to the return conveying belt (2). The functions of the parts remain substantially like those that have been described hereabove.

The raising and lowering movements of the arrival emplacement (36) or of the leaving one (37) is realized, for instance, by means of pneumatic pistons (41) or other like means, and aligned sliding guides (42).

Although the invention has been described above in conjunction with specific embodiments, offered for illustrative purpose only, it is evident that many alternatives and variations will be apparent to those skilled in the art, in the light of the above description.

Accordingly, the invention is intended to embrace all of the alternatives and variations that fall within the spirit and the scope of the appended claims.

What is claimed is:

1. A system for the automatic loading/unloading of products, comprising:

a) a store (19') for the products comprising a plurality of housings (23') each formed by a shelf (20,20') adapted to house or store a product thereon, the shelves of said housings being aligned and arranged on a platform (29) in the form of a carousel including means for rotating said platform (29) about a vertical axis;

b) an unloading station (32) comprising a fixed traveling lift (31) in the form of a roller conveyor for moving a product by means of gravity from a housing (23') to be unloaded, and an inclined top (33) consisting of an inclined roller conveyor connecting the shelf (20,20') of the housing (23') to be unloaded to the traveling lift (31);

c) a loading station (34) comprising a conveyor belt (30) with driving means for lifting a product to a housing (23') to be loaded, an inclined top (35) consisting of an inclined roller conveyor connecting the shelf (20,20') of the housing (23') to be loaded to the conveyor belt (30), and a collection conveyor (18) associated with conveyor belt (30) at the loading station (34) for directing the product to be loaded from the belt (30) onto the inclined top (35) to be transported by means of gravity onto the shelf (20,21') of the housing (23') to be loaded; and d) pushing means (50) arranged adjacent the housing (23') to be unloaded on a side thereof opposite traveling lift (31) for pushing a product in the housing (23') to be unloaded onto the inclined roller conveyor of the inclined top (33) to be transported by means of gravity to traveling lift (31).

2. The system for the automatic loading/unloading of products as defined in claim 1, wherein each shelf (20, 20') comprises a plurality of rollers arranged parallel to each other and transverse to the direction of movement of the product thereon.

3. The system for the automatic loading/unloading of products as defined in claim 1, wherein the inclined top (33) and the inclined top (35) comprise a plurality of rollers arranged parallel to each other and transverse to a direction of movement of the product thereon.

4. The system for the automatic loading/unloading of products as defined in claim 1, wherein each shelf (20, 20') of the plurality of housings (23') is inclined away from the unloading station (32) and the loading station (34) and the pushing means (50) is aligned according to an inclination of said shelves (20,20').

5. The system for the automatic loading/unloading of products as defined in claim 1, which further comprises a work station (17) having an arrival emplacement (36) communicating with the fixed traveling lift (31) of said unloading station (32) by means of a first conveyor (16), and a leaving emplacement (37) communicating with the conveyor belt (30) of said loading station (34) by means of a second conveyor (2), wherein said arrival emplacement (36) includes an inclined table (38) having rollers (45) disposed substantially parallel to a direction of movement of said first conveyor (16) for receiving product therefrom and said leaving emplacement (37) includes a first inclined table (39) and a second oppositely inclined table (40) having rollers disposed substantially parallel to a direction of movement of said second conveyor (2) for delivering product to said second conveyor (2).

6. The system for the automatic loading/unloading of products as defined in claim 5, wherein said arrival emplacement (36) is fixed and aligned with said first conveyor (16), and said leaving emplacement (37) is movable between positions adjacent said arrival emplacement (36) and said second conveyor (2).

7. The system for the automatic loading/unloading of products as defined in claim 6, which further comprises a mechanical control system for controlling and coordinating rotation of said store (19'), positioning of the housing (23') to be loaded, movement of the pushing means (50) for pushing a product in the housing (23') to be unloaded onto the unloading station, the arrival emplacement (36) of work station (17) and the leaving emplacement (37) of work station (17).

8. The system for the automatic loading/unloading of products as defined in claim 6, which further comprises an electronic control system for controlling and coordinating rotation of said store (19'), positioning of the housing (23') to be unloaded, movement of the pushing means (50) for pushing a product in the housing (23') to be unloaded onto the unloading station, the arrival emplacement (36) of work station (17), and the leaving emplacement (37) of work station (17).

9. The system for the automatic loading/unloading of products as defined in claim 1, wherein there is provided a plurality of superposed platforms (29) on each of which is aligned and arranged said plurality of housings (23').

10. The system for the automatic loading/unloading of products as defined in claim 9, wherein the superposed platforms (29) are adapted to rotate synchronously.

11. The system for the automatic loading/unloading of products as defined in claim 9, wherein the superposed platforms (29) are adapted to rotate independently to each other.

* * * * *